United States Patent [19]
Lee

[11] Patent Number: 5,218,995
[45] Date of Patent: Jun. 15, 1993

[54] THREE-WAY VALVE ASSEMBLY WITH WATER QUANTITY RECORDING METER FOR A STORAGE TANK OF THE REVERSE OSMOSIS WATER PURIFIER

[76] Inventor: Shih-Ping Lee, 1-4, Fu Te Lane, Tai Ping Rd., Tai Ping Shiang, Taichung Hsien, Taiwan

[21] Appl. No.: 925,261

[22] Filed: Aug. 6, 1992

[51] Int. Cl.⁵ .............................................. F16K 37/00
[52] U.S. Cl. .............................. 137/557; 137/625.46; 251/288
[58] Field of Search ............................ 137/557, 625.46; 251/288

[56] References Cited

U.S. PATENT DOCUMENTS

| | | | |
|---|---|---|---|
| 1,328,578 | 1/1920 | Malby | 137/557 X |
| 1,558,789 | 10/1925 | Carrey | 137/557 X |
| 1,710,128 | 4/1929 | Welch | 137/557 |
| 3,031,165 | 4/1962 | Allen | 137/557 X |
| 3,361,160 | 1/1968 | Alper | 137/557 |
| 3,554,225 | 1/1971 | Debenedetto | 137/557 |
| 3,633,618 | 1/1972 | Blackmore et al. | 137/557 X |
| 4,327,589 | 5/1982 | Förster | 137/557 X |

FOREIGN PATENT DOCUMENTS

| | | | |
|---|---|---|---|
| 743774 | 10/1966 | Canada | 137/557 |
| 853888 | 3/1940 | France | 137/557 |

*Primary Examiner*—John Rivell
*Attorney, Agent, or Firm*—Bacon & Thomas

[57] ABSTRACT

A three-way valve assembly connected between the purified water delivery tube and the pressure tank of a reverse osmosis water purifier, which includes a casing having a three-way valve controlled by a rotary lever to open or close the passage way through the casing, and a meter fastened to the casing to measure the quantity of water in the pressure tank.

1 Claim, 6 Drawing Sheets

THREE-WAY VALVE ASSEMBLY WITH WATER QUANTITY RECORDING METER FOR A STORAGE TANK OF THE REVERSE OSMOSIS WATER PURIFIER

BACKGROUND OF THE INVENTION

The present invention relates to a three-way valve assembly for a storage tank of a reverse osmosis water purifier which includes a meter for measuring the current quantity of water in the pressure tank of the water purifier.

Reverse osmosis water purifiers are widely accepted for industrial as well as home uses. FIG. 1 illustrates an installation of a reverse osmosis water purifier, in which water from a water tap 10 is pumped into a water filter unit 12 by a water pump 11, and purified water is delivered from the water filter unit 12 into a pressure tank 14 through a purified water delivery tube 13. The pressure tank 14 is filled with compressed air to squeeze an inflatable water container 15, as seen in FIG. 2, which has an outlet connected to the purified water delivery tube 13. There is provided a pressure regulator 17 on the purified water delivery tube 13, which automatically turns off the water pump 11 as the inflatable water container 15 is fully filled up with purified water, or turns on the water pump 11 letting it to pump water into the water filter unit 12 as the inflatable water container 15 is on low level. This structure of reverse osmosis water purifier has no means to measure the operation time in increasing the water pressure inside the pressure tank 14 from the low level to the high level. Under normal conditions, increasing the water pressure inside the pressure tank 14 from zero reading (zero water level) to high-water level (full load) requires a certain length of operation time. When a relative longer time was taken to fill the inflatable water container 15 of the pressure tank 14 to high-water level, it means that the system of the reverse osmosis water purifier is abnormal, and the filter element, the water piping, the water pump 11, as well as the water tap 10 should be checked. If the reverse osmosis water purifier is abnormal, water still will flow out of the water outlet 16 during the operation of the system even when it is opened and even if the pressure tank 14 is at zero water level. Therefore, an user can not know the current water level in the inflatable water container 15 inside the pressure tank 14.

SUMMARY OF THE INVENTION

One object of the present invention is to provide a three-way valve assembly for a reverse osmosis water purifier which uses a meter to measure the current quantity of water in the pressure tank. Another object of the present invention is to provide a three-way valve assembly for a reverse osmosis water purifier which uses the meter to check the filtration rate of the reverse osmosis water purifier as well as set up the on & off function of the tank auto-shut-off switch to determine if the reverse osmosis water purifier works normally.

BRIEF DESCRIPTION OF THE DRAWINGS

FIG. 2-1 is a sectional plan view of the pressure tank of the reverse osmosis water purifier showing that the expansion water container has been completely exhausted;

FIG. 2-2 is another sectional plan view of the pressure tank of reverse osmosis water purifier showing that the expansion water container has been expanded by filling water;

DETAILED DESCRIPTION OF THE PREFERRED EMBODIMENT

Figure 1:
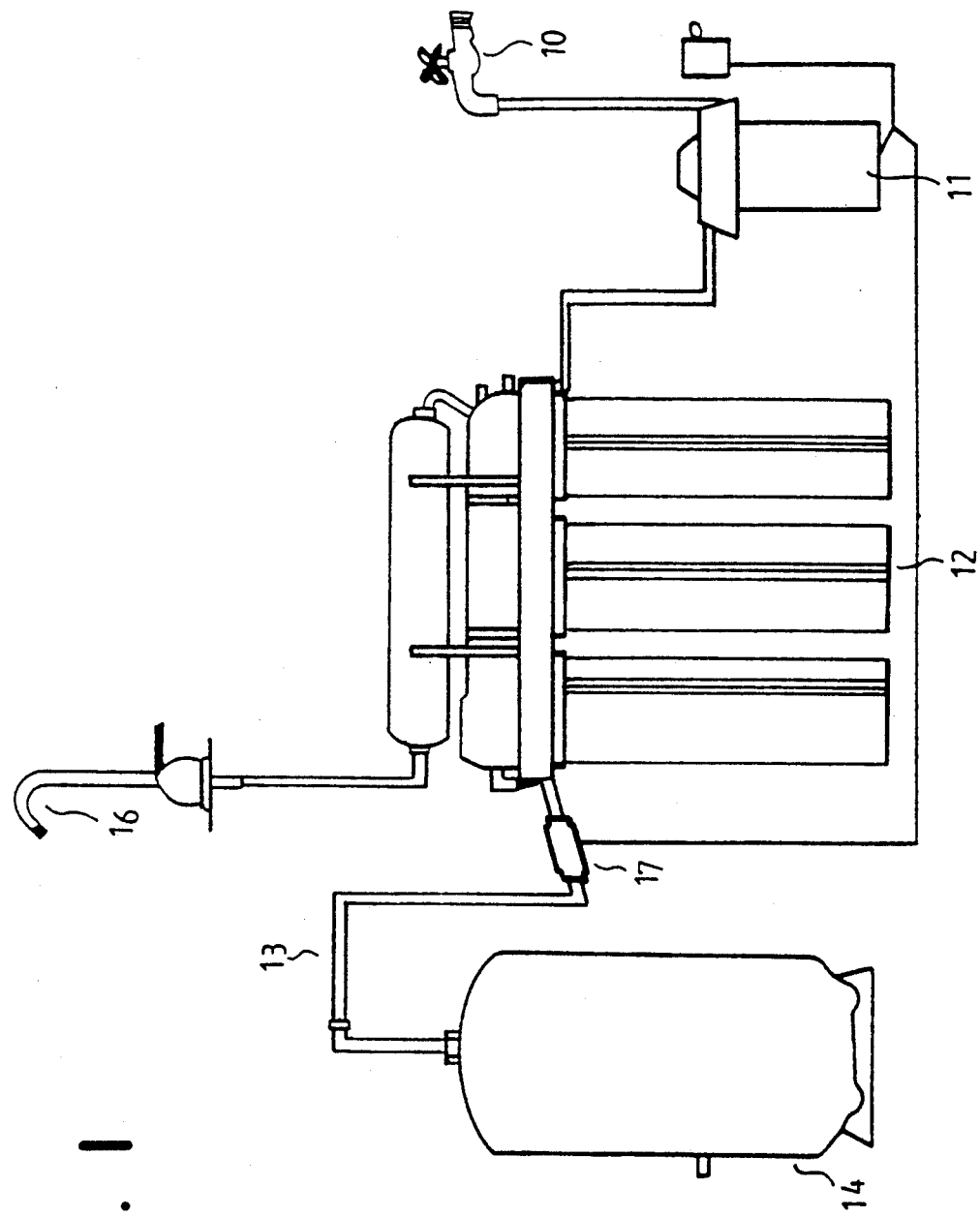
FIG. 1 is a plan view of a reverse osmosis water purifier.
Figure 2B:
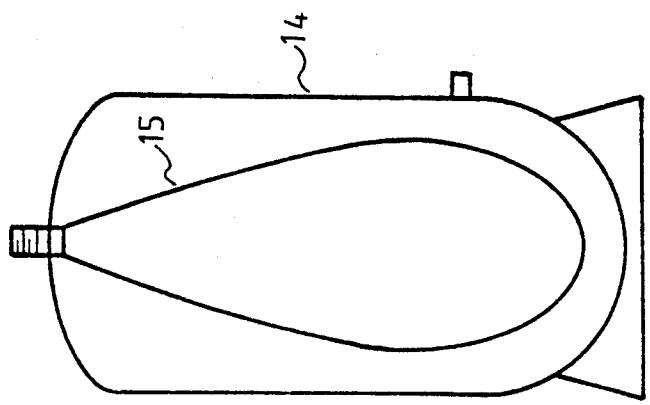
Figure 2A:
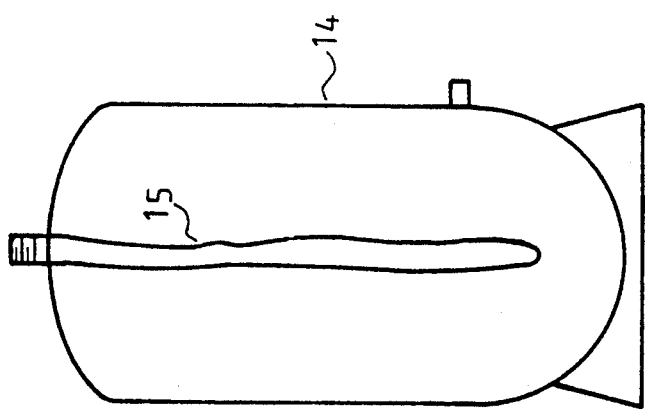
Figure 3:
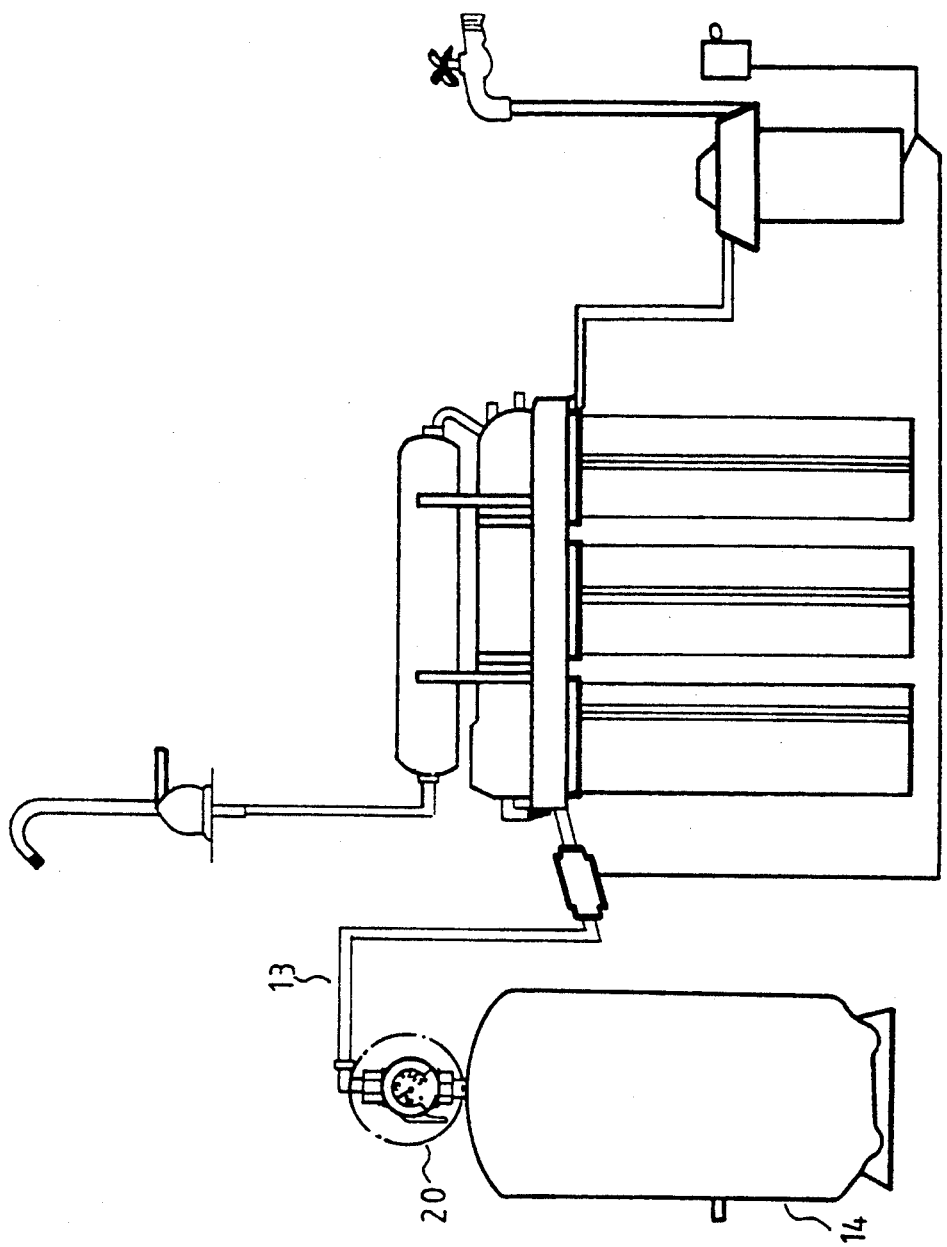
FIG. 3 illustrates an installed example according to the present invention.
Figure 4:
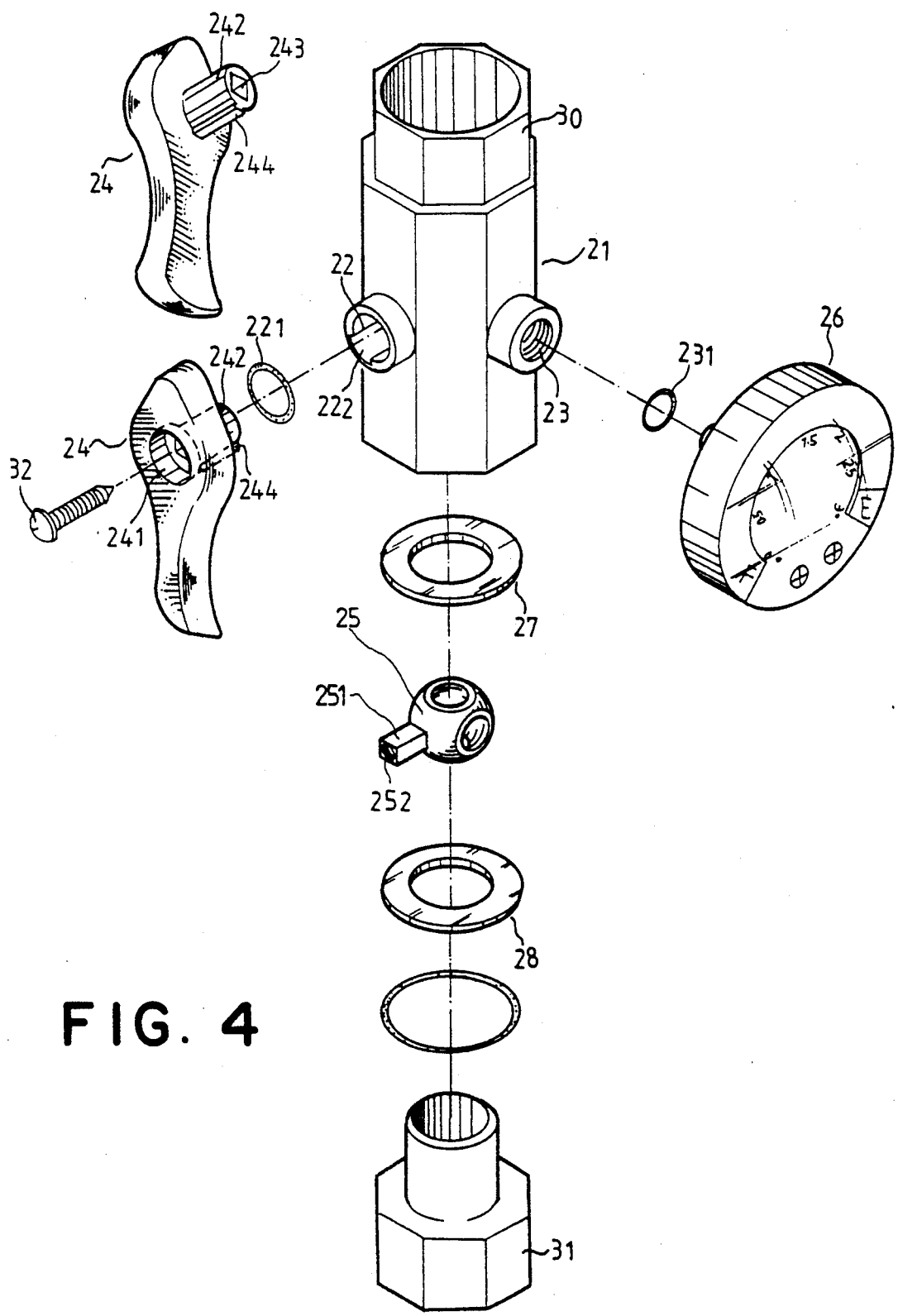
FIG. 4 is an exploded view of a three-way valve assembly embodying the present invention.
Figure 5:
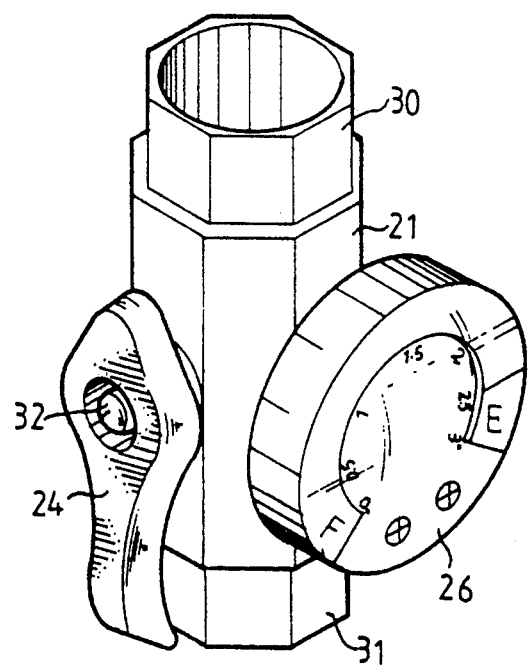
FIG. 5 is a perspective view of the three-way valve assembly.

Referring to FIGS. 3, 4 and 5, a three-way valve assembly 20 which is installed in a reverse osmosis water purifier between the purified water delivery tube 13 and the pressure tank 14 is generally comprised of a casing 21, a rotary lever 24, a meter 26, a three-way ball valve 25, two gasket rings 27,28, an upper connecting socket 30 and a lower connecting socket 31. The casing 21 has a stub tube 22 and a short, internally threaded tube 23 on the outside at a right angle thereto and respectively communicating with the inside space thereof, wherein the stub tube 22 has a notch 222 on the inside wall thereof. The rotary lever 24 and the water meter 26 are respectively fastened to internally stub tube 22 and threaded tube 23 and sealed by respective seal rings 221,231. The rotary lever 24 has a connecting rod 242 on one side at right angle inserted into the stub tube 22 on the casing 21, a key 244 on the connecting rod 242 engages into the notch 222 on the stub tube 22, a square hole 243 through the central axis of the connecting rod 242, and a countersunk hole 241 on an opposite side aligned with the square hole 243. The meter 26 has a dial and a needle for showing the current quantity of water in the pressure tank 14, which is measured according to the water pressure detected. The three-way ball valve 25 which has three passage holes through the body thereof in different directions communicating with one another is coupled with a square rod 251, which has a bolt hole 252 on the top end thereof.

The assembly process of the valve assembly is simple. The upper socket 30 is top part of the casing 21. Then, the first gasket ring 27, the three-way ball valve 25 and the second gasket ring 28 are inserted from the bottom into the casing 21 in proper order and secured in place by the lower connecting socket 31. Before fastening the lower connecting socket 31 to the casing 21, the square rod 251 of the three-way ball valve 25 is inserted through the stub tube 22 into the square hole 243 on the connecting rod 242 of the rotary lever 24, and then thread a screw 32 through the countersunk hole 241 into the bolt hole 252 on the square rod 251 to connect the three-way ball valve 25 to the rotary lever 24. Once the meter 26 has been fastened to the short, internally threaded tube 23 by a screw rod (not shown), the assembly process is done. When assembled, the key 244 is confined within the notch 222 so that the rotary lever 24 is allowed to only rotate through a 90 degree angle.

Figure 6:
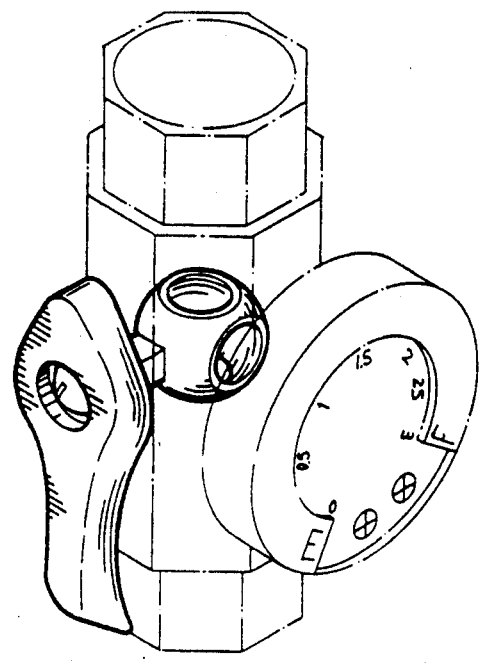
FIG. 6 is a perspective view of the three-way valve assembly showing that the three-way valve is rotated into an opened position to let water pass through the casing of the valve assembly.
Figure 7:
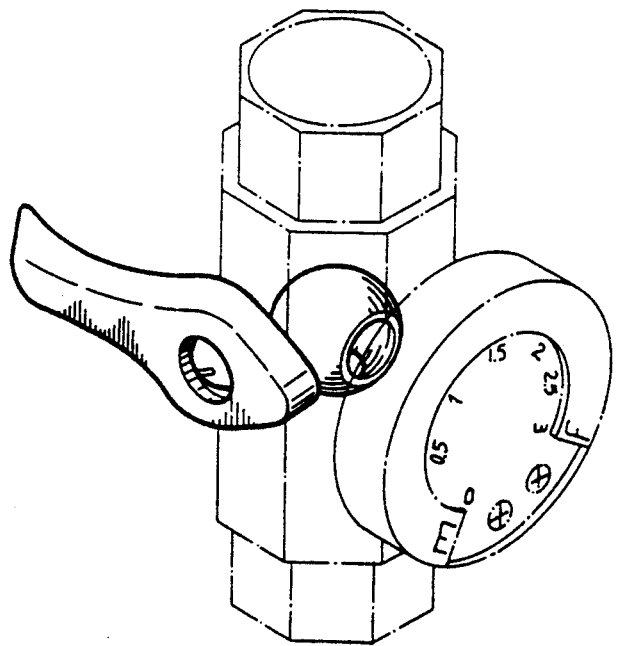
FIG. 7 is another perspective view of the three-way valve assembly showing that the three-way valve is rotated into a closed position to stop water from passing through the casing.

Referring to FIGS. 6 and 7, the three-way ball valve 25 can be alternatively rotated by the rotary lever 24 to either limit position in opening or closing the passage way between the upper connecting socket 30 (the purified water delivery pipe 13) and the lower connecting socket 31 (the pressure tank 14). When the three-way ball valve 25 has been rotated to the first limit position, as shown in FIG. 6, water is allowed to flow from the purified water delivery tube 13 into the pressure tank 14 or from the pressure tank 14 into the purified water delivery tube 13. When the three-way ball valve 25 has been rotated to the second limit position, as shown in FIG. 7, the passage way between the upper connecting socket 30 and the lower connecting socket 31 is closed, and therefore water in the purified water delivery tube 13 is prevented from passing into the pressure tank 14 and accumulated water in the pressure tank 14 is prohibited from being delivered back into the purified water delivery tube 13. Because the three-way ball valve has three passage holes, the hole to the meter 26 is constantly in communication with the the hole to the pressure tank 14. Therefore, the meter 26 constantly measures the water pressure inside the pressure tank 14 and converts it into indications to show the quantity of water in the pressure tank 14. By means of the meter 26, the user can regularly check the system of the reverse osmosis water purifier. If the pressure tank 14 cannot be completely filled up with purified water within a fixed length of time after start of the reverse osmosis water purifier, it means that the system of the water purifier is abnormal and should be inspected.

What is claimed is:

1. A three-way valve assembly comprising:
a) a casing including an upper socket defining a water inlet for connection to a purified water delivery tube of a reverse osmosis water purifier, and a lower socket defining a water outlet for connection to a pressure tank of a reverse osmosis water purifier;
b) a stub tube and an internally threaded tube positioned at a right angle from each other on the outside of the casing and disposed in fluid communication with the water inlet and water outlet, the stub tube including a notch formed therein;
c) a rotary lever including a connecting rod and a key on the rod, the connecting rod being inserted within the stub tube with the key disposed within the notch, the connecting rod further including a square hole therethrough and a counter sunk hole on a side thereof aligned with the square hole;
d) a meter secured to the internally threaded tube for detecting water pressure and converting same into corresponding indications;
e) a three-way ball valve disposed within the casing, the ball valve including a valve body coupled with a square rod, the valve body having a first passage hole for connection to the water inlet, a second passage hole for connection to the water outlet, and a third passage hole for connection to the meter, the square rod being secured within the square hole of the connecting rod; and
f) wherein rotation of the lever arm moves the key between opposite ends of the notch to alternatively connect the first passage hole to the water inlet, the second passage hole to the water outlet and the third passage hole to the meter for permitting fluid flow through the casing or the first passage hole to the meter and the third passage hole to the water outlet for blocking fluid flow through the casing.

* * * * *